Dec. 27, 1932.      E. G. STRECKFUSS      1,891,960
TIME RECORDER
Filed Aug. 16, 1929      7 Sheets-Sheet 4

INVENTOR.
Elwood G. Streckfuss
BY
ATTORNEY.

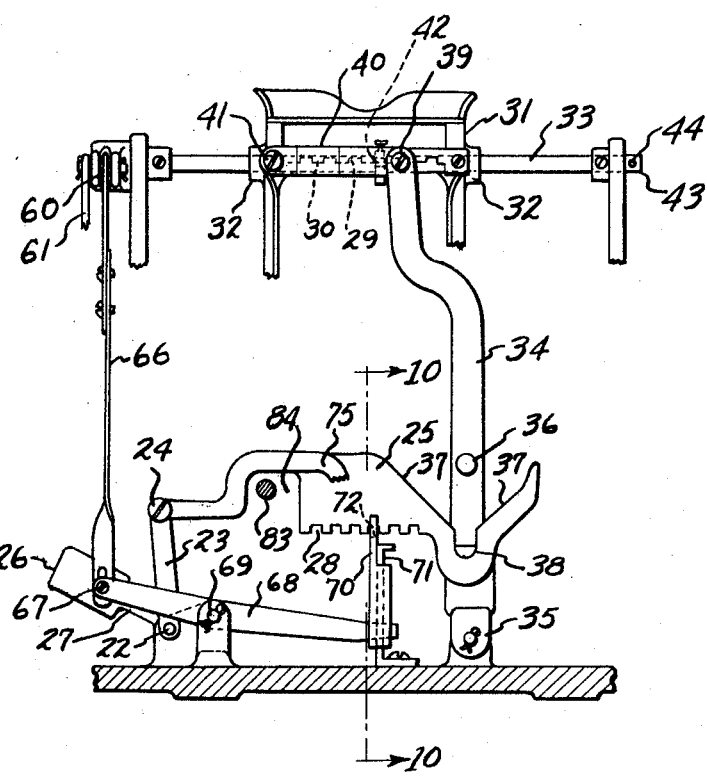
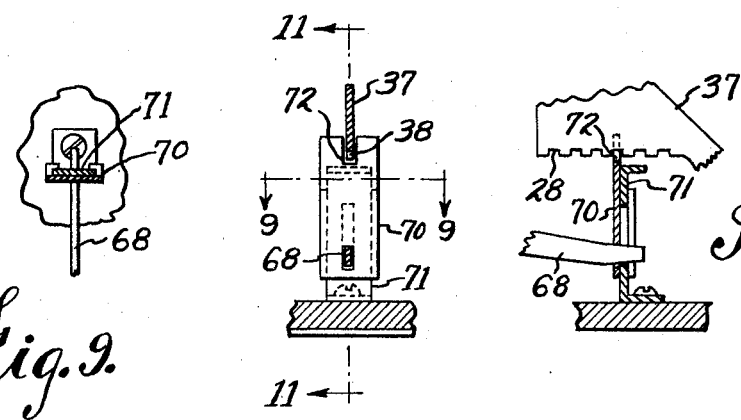

Patented Dec. 27, 1932

1,891,960

UNITED STATES PATENT OFFICE

ELMER G. STRECKFUSS, OF CINCINNATI, OHIO, ASSIGNOR TO THE CINCINNATI TIME RECORDER COMPANY, OF CINCINNATI, OHIO, A CORPORATION OF OHIO

TIME RECORDER

Application filed August 16, 1929. Serial No. 386,458.

My invention relates to time recorders of the automatic type in which the tray is positioned automatically with reference to a desired sequence of ringing in and ringing out operations. The invention specifically relates to improvements in the method of shifting the tray in which the parts only move to make the immediate shift and are not moved with each operation of the mechanism as has been customary in former machines.

The general type of time recorder to which my invention relates is disclosed in the Larabee Patent No. 935,312, to which reference is hereby made. In this type of mechanism the timing disc has lugs which may be set thereon and which actuate mechanism for setting the tray so that with the movement of the registering lever the tray will be moved to the desired predetermined setting. In the Larabee recorder each time the registering lever is moved all the parts are actuated, but the tray only moves after the predetermined setting on the timing disc has been reached.

It is the object of my invention to avoid unnecessary movement of the parts which of course greatly increases the life of the machine. For example, should there be one hundred employees who ring on a clock of the old type, all the actuating parts are moved four hundred times per day, whereas with my new improvement, only the parts essential to the registering are moved four hundred times and those parts which control the shifting of the tray move usually only four times.

Further it is an object of my invention to provide a locking device for the tray which will prevent unauthorized movement of the tray by an employee seeking to register improperly, and as unauthorized movement of the tray often results is breakage of the parts, it is an object to prevent unnecessary breakage. It is also an object of my invention to provide a key for the locking device which will permit setting of the tray for unusual requirements such as occur, for example, when an employee becomes sick and has no way of indicating when he has departed. Suppose the mechanism is set for shifting at 9 A. M. to the noon-out position. The clerk in charge of the time clock may unlock the lock and set the tray for ringing out, as for example at 8:30, prior to such time as the tray would be automatically moved. After the one unusual registration the mechanism will return to its normal position.

The above and other objects to which reference will be made in the ensuing disclosure I accomplish by that certain combination and arrangement of parts of which I have illustrated a preferred modification.

In the drawings:—

Figure 8 is a sectional front elevation, the section being on the plane of the line 8—8 of Fig. 3.

Figure 9 is a horizontal cross section on the plane of the line 9—9 of Fig. 10.

Figure 10 is a sectional side elevation, the section being on the plane of the line 10—10 of Fig. 8.

Figure 11 is a vertical section on the plane of the line 11—11 of Fig. 10.

Figure 1:
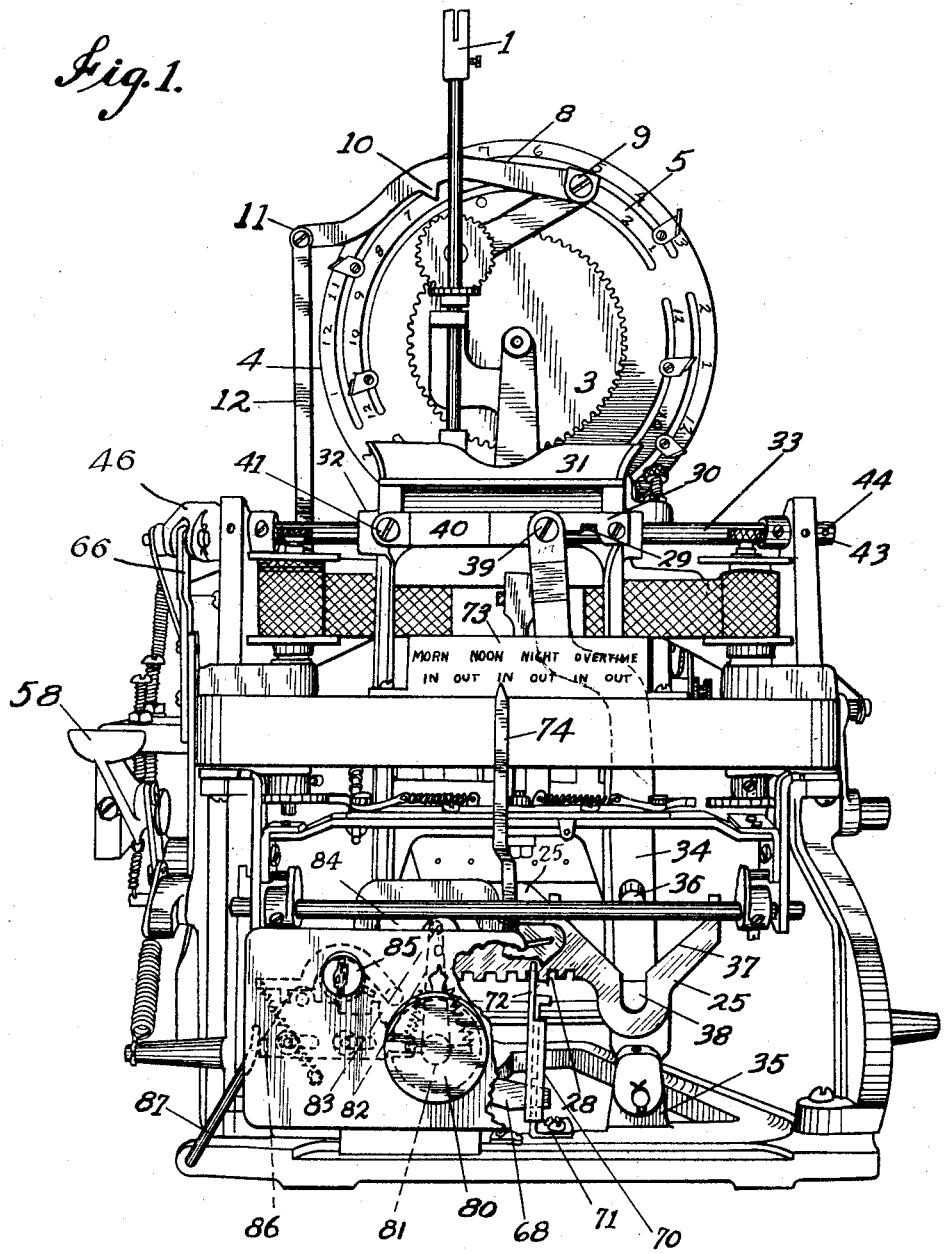
Figure 1 is a front elevation of the complete assembly.
Figure 2:
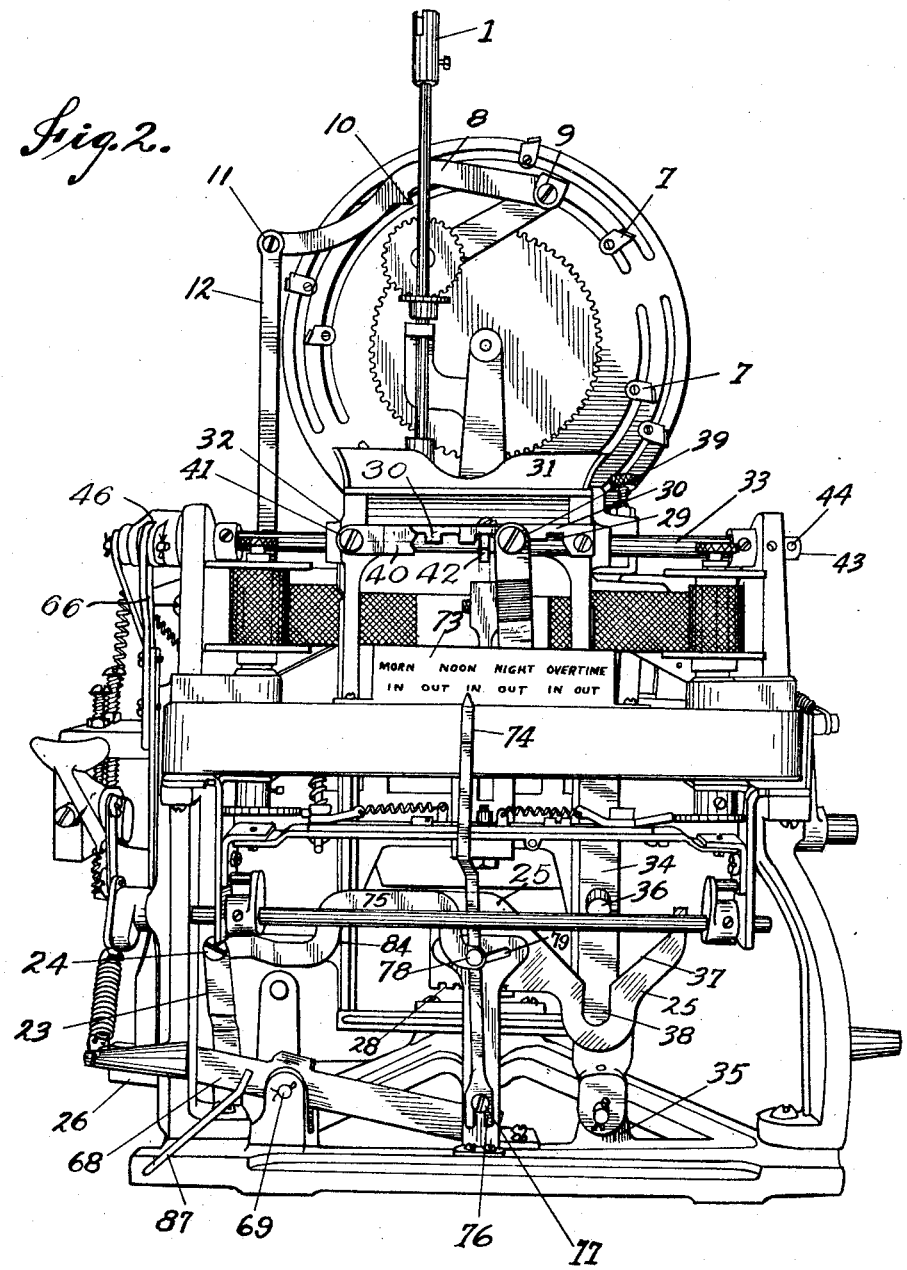
Figure 2 is a front elevation as shown in Figure 1 with the locking device removed.

I have not shown the clock mechanism, as this forms no part of my invention. The clock mechanism rotates the time shaft indicated at 1, the connection between the clock mechanism or the electric driving apparatus and the shaft being in accordance with standard practice. The time shaft rotates gears which rotate the time or type wheels 2, the peripheries of which are provided with suitable type for indicating hours and minutes, days or dates. Different ratios of movement for the type wheels are provided in accordance with standard practice. Through a train of gears 3 the time disc 4 is rotated, usually once in twenty-four hours.

The disc 4 is graduated as indicated at 5 with indicia to indicate various intervals during the twenty-four hour period. The disc is provided with arcuate slots 6, within which trip lugs 7 may be set at desired intervals.

As the shaft 1 is rotated the disc 4 is also rotated and the trip lugs 7 are carried around with it. There is an arm 8 pivoted at 9 which has a dog 10 which is engaged by the lugs 7 thereby elevating periodically the end of the arm 8 which is connected as at 11 with the lift bar 12.

The lift bar 12 is pivotally connected at 13 with a pawl carrier 14 which is pivoted in the machine frame at 15. Pivotally mounted at 16 on the pawl carrier is the pawl 17. The pawl engages the teeth of a ratchet 18 which is fixedly mounted on a shaft 19. As the disc travels on and the arm drops off of the trip lug the arm 8 drops and carries with it the connecting bar 12, and the pawl and pawl carrier revolve the ratchet. A cam 20 is fixedly mounted on the shaft 19 and it also revolves with the shaft 19 and positions a cam rider 21 which is mounted on another shaft 22.

As the shaft 22 is revolved it oscillates the arm 23 which is pivotally connected at 24 with the locating bar 25. A weight 26 on an arm 27 is fixedly mounted on the shaft 22 tending to move back the arm 25 after it has completed its various sequential setting operations.

The locating bar, on its lower edge, is provided with a series of spaced indentations 28 which have a proportional ratio relative to spaced indentations 29 which are provided in the lower edge of a plate 30 mounted on the card tray carriage 31 through which the employee inserts his time card. The tray carriage has bushings 32 which are slidable on a shaft 33 extending laterally across the machine frame.

The shifting bar 34 is pivoted in a boss 35 in the machine frame. The bar 34 has a pin 36 which, as will be hereinafter explained, cooperates with the angled faces 37 and seating groove 38 of the locating bar 25. The shifting bar 34 is pivotally connected at 39 with a link 40. The link 40 is pivotally connected, as at 41, with the card tray carriage 31.

The shaft 33 which is intermittently rocked, as will be hereinafter explained, with the movement of the registering lever, carries a locking lug 42 which engages one of the indentations 29 of the plate 30, and until such time as the shaft 33 is rocked, the tray carriage is securely locked against sliding movement. The end of the shaft 33 protrudes, as indicated at 43, through the machine frame, and a pin 44 is tensioned with a spring 45 so that with the release of the parts which cause the rocking movement of the shaft 33 the locking lug will seat itself within one of the indentations 29.

The end of the shaft 33 also protrudes through the machine frame at its end opposite the end 43 and carries pivotally mounted thereon a walking beam 46. One end of the walking beam carries on a pivot 47 a lifting shifter bar 48. The bar 48 has an inclined lower edge 49 and a hook shaped portion 50 which, when elevated, as will be hereinafter described, causes the walking beam to be rocked.

The inclined edge 49 rides along a horizontally movable pawl 51 pivoted at 52 and engages an inclined face 53 of the pawl during its movement. The pawl is tensioned with a spring 54. The pawl 51 is moved by engagement with the teeth 55 of ratchet 56, which is fixedly mounted on the shaft 19. With each advance of a tooth of the ratchet 56 the pawl 51 is moved so that it releases the inclined face 49 of the lifting shifter bar 48. The bar 48, being released, drops by gravity, so that its hooked portion 50 is engaged by a pin 57 which is elevated with the depression of the registering lever 58. The registering lever is pivotally mounted in the machine frame at 59. When the pawl 51 has released the bar 48, which only occurs when a trip lug 7 has caused the actuation of the parts which actuate the ratchet 56, the depression of the registering lever moves the bar 48 to elevated position where it drops back down behind the locking pawl 51 to the position indicated in dotted lines in Figure 3. Excepting when a trip lug 7 causes the particular movement described, or when the parts are set for an unusual registration, the bar 48 hangs idly without having its hooked portion 50 engaged by the pin 57. From this it may be seen that all the parts relating to the movement of the card tray are ordinarily inhibited excepting at the predetermined intervals in accordance with the settings of the lugs 7.

Pivotally mounted at 60 on the other end of the walking beam arm 46 is a trip arm 61 which has an indentation 62 on its upper surface. The indentation 62 is engaged by a trip dog 63 fixedly mounted on the end of the shaft 33. The end of the trip arm 61 opposite its pivot has a spring 64 which normally pulls it upwardly.

Figure 3:
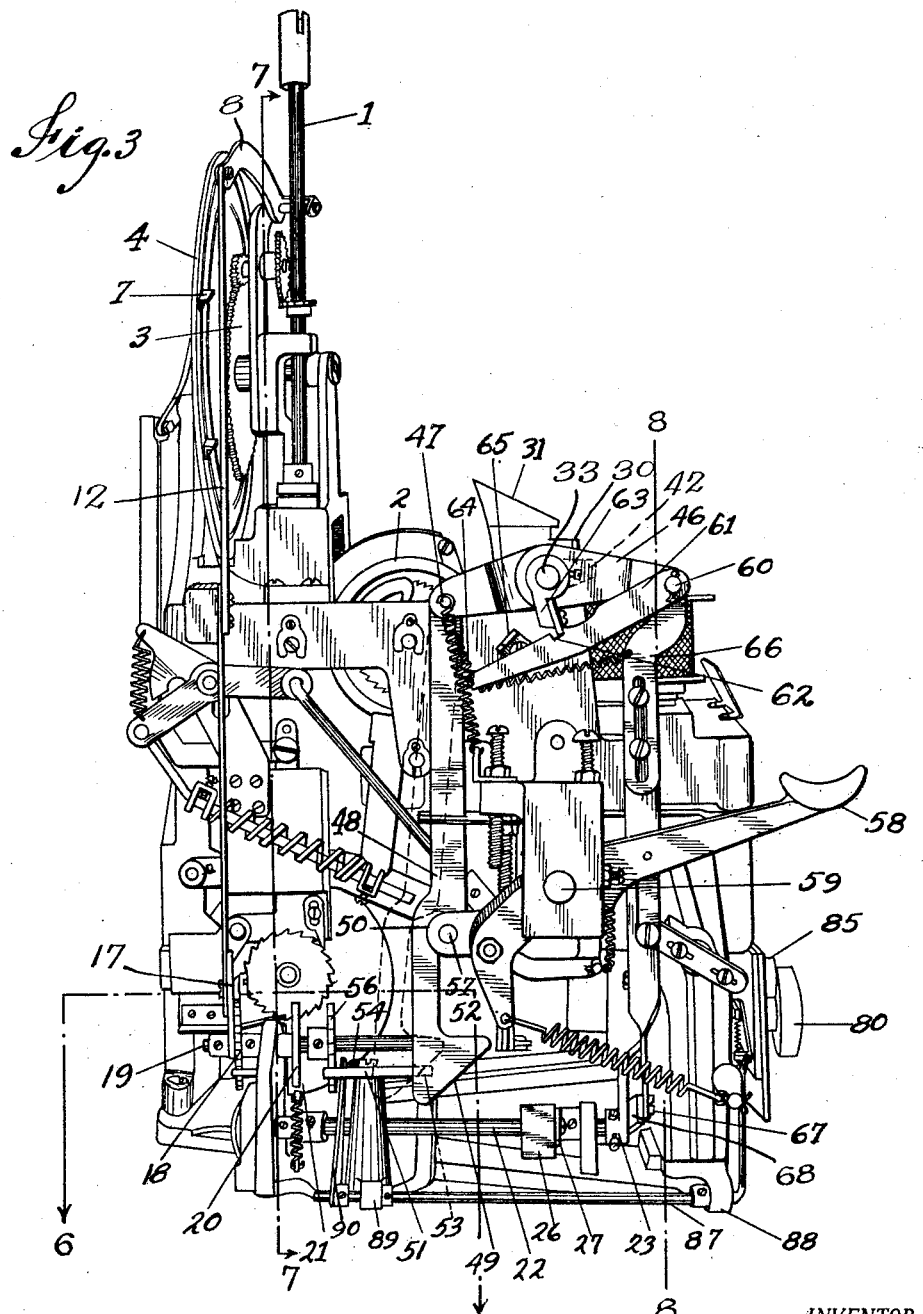
Figure 3 is a side elevation showing that side of the machine to which my improved mechanism has been applied.
Figure 4:
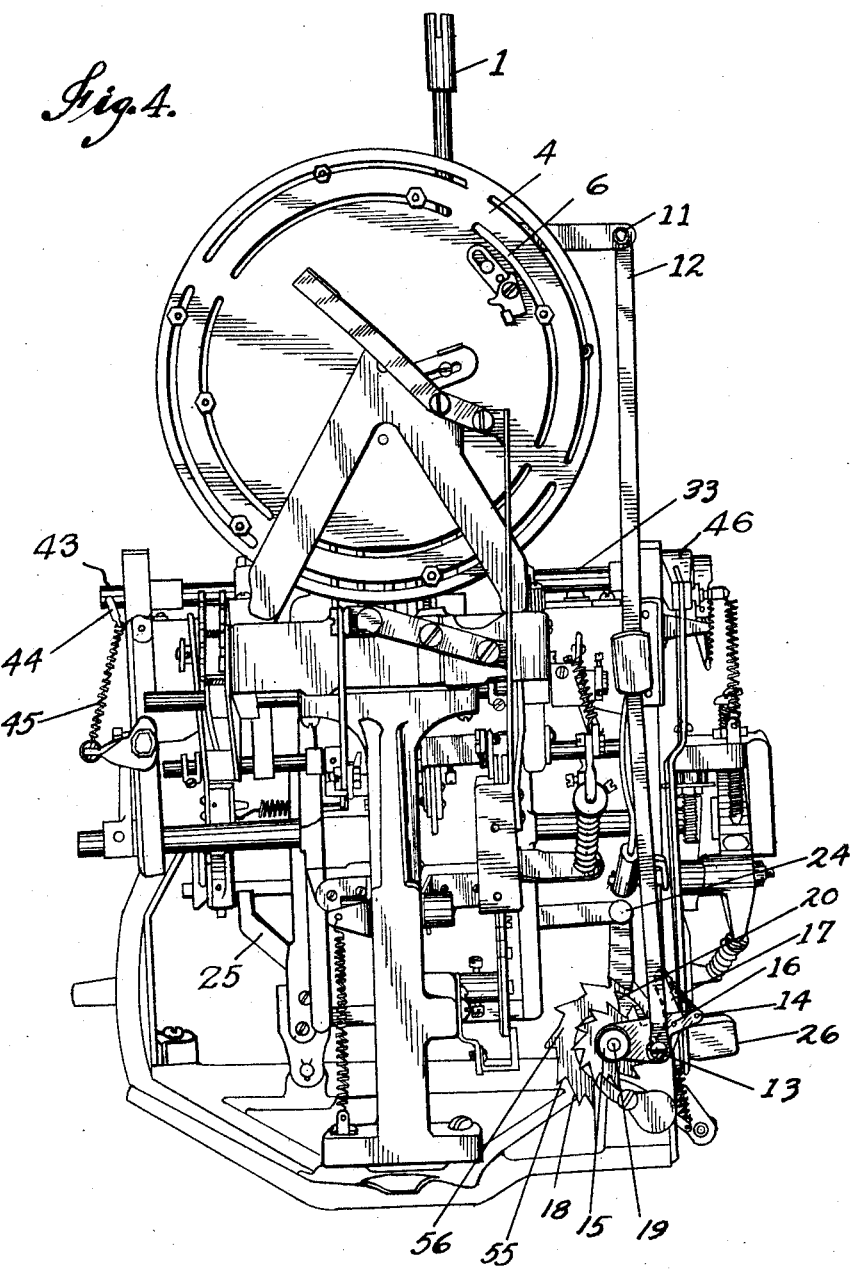
Figure 4 is a rear elevation of the assembly.
Figure 5:
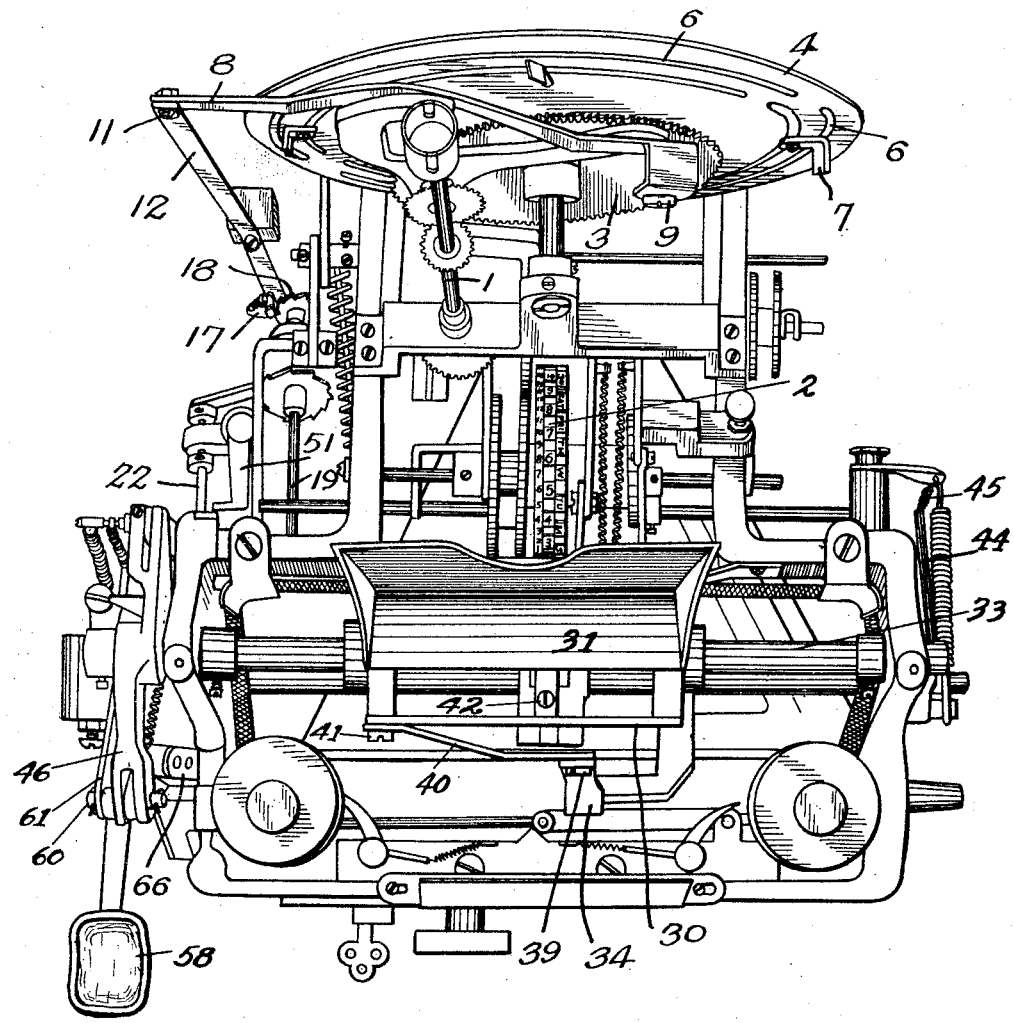
Figure 5 is a plan view of the assembly.
Figure 6:
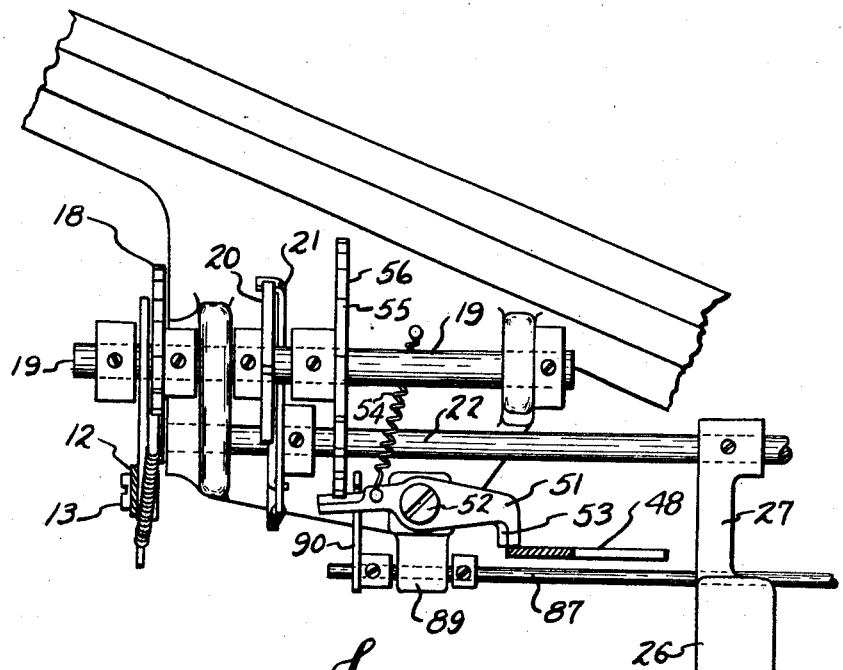
Figure 6 is a sectional plan, the section being on the plane of the line 6—6 of Fig. 3.
Figure 7:
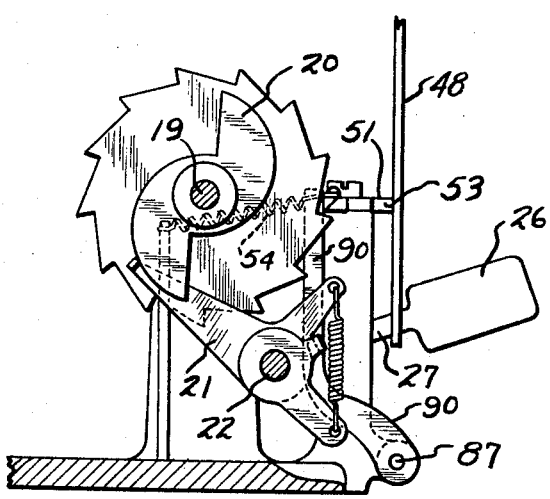
Figure 7 is a sectional rear elevation, the section being on the plane of the line 7—7 of Fig. 3.

With the rocking of the walking beam, the arm 61 moves to the left as shown in Figure 3 and the indentation engaging the trip dog 63, causes the trip dog to rock the shaft 33 clockwise as shown in Figure 3, which causes the locking lug 42 to be depressed and released from the indentations in the plate 30 so that the card tray carriage may be moved. After this release of the tray carriage the sequence of operation, which will be hereinafter described, occurs and further movement of the trip arm 61 causes this arm to bear against a stop 65 so that further movement of the walking beam causes the arm 61 to move in a clockwise direction, as shown in Figure 3, so that the trip dog is disengaged from the indentation 62. This releases the trip dog 63 and the spring 45 then rocks the shaft 33 in a counterclockwise direction bringing the parts back to their normal position with the locking lug 42 seated within the positioned indentation 29.

The sequence of operations described in the preceding paragraph all occur prior to the registration, so that the parts are again in set and locked position before the registration occurs. This makes it impossible for anyone to move the tray during registry and secure other than the predetermined registration.

Also pivotally mounted in the walking beam 46 is a link 66 which is pivotally connected at 67 with a lifting arm 68. The arm 68 is pivotally mounted in the machine frame as indicated at 69, and it engages a slider 70 mounted on slideway 71. The slider 70 has a forked upper end the crotch 72 of which engages in the indentations 28. The elevation of the slider raises the positioning bar 25 until one of the angle sides 37 of the positioning bar strikes the pin 36. Then the pin slides down the angular face of the locating bar moving the tray carriage until the pin 36 is in registry with the slot 38. The tray is then located and the registration is then made with the completion of the movement of the registration lever.

The frame of the machine is provided with a calibrated plate 73 for indicating different in and out periods and various other positions of the tray. Over the face of the plate I have provided an indicating pointer 74. The pointer is pivoted in an arm 75 which connects with the link 23 at the pivot point 24. At the lower end of the pointer 74 a slot 76 engages a stud 77 mounted on a bracket in the machine frame. Straight line movement is provided for the end of the pointer which rides along the calibrated plate by extending the pivot pin 78 of the pointer and arm 75 and guiding it in an arcuate slot 79.

A shifting dial 80 is provided which is mounted on a shaft 81 carrying a crank arm 82. The crank carries at its end a lug 83 which engages a slotted portion 84 of the locating bar 25. The shifting dial is ordinarily locked against movement by means of the lock 85. When the lock is unlocked the tumbler carries a lug 86 which bears against a bar 87. The bar is pivoted in journals 88, 89, and has an end 90 which rocks against the horizontally pivoted pawl 51, thereby releasing the lifting shifter bar 48. The shifting dial 80 must be held in the desired position pending the unusual registration for which the key is provided, because as soon as the tray has been moved to the desired position for the unusual registration the weight 26 tends to bring the parts back to the set position prior to unlocking of the lock with the cam rider 21 seated against the face of the cam 20, and the parts, with the exception of the tray, all in the normal position which they had previously occupied. After the unusual registration the next regular registration will correct the position of the tray as the elevation of the locating bar 25 finds the pin 36 out of alignment with the groove 38 and the inclined face 37 bears against the pin 36, causing it to move the tray carriage back to the correct predetermined location. Under normal operation of the recorder such an operation would not be possible, as all of the parts which move the tray carriage, including the shifting bar 34, would be inhibited. However, when the lock is unlocked and the end 90 of the bar 87 has caused the horizontal pawl 51 to release the inclined face 49 of the lifting shifter bar 48, the completion of the registration will not result in the inclined face 49 dropping back into locked position behind the face 53 of the pawl 51, and the succeeding registration will find the parts in a position similar to that which they assume after one of the tripping lugs 7 has caused an advance in setting. Since there has been no change, however, in the setting of the parts, due to the advance of a tripping lug, the next registration will merely move the tray carriage back to the former set position.

As has been noted, the principal advantages of the construction described lie in the fact that the parts which actuate the tray shifting operation only move at such intervals as the advance in setting require. The particular difficulties encountered in the effort to work out a practical structure which would accomplish this, was in the provision of suitable mechanism which would positively and automatically advance the tray carriage and still leave some means by which the recorder could be set for an unusual registration.

Having thus described my invention, what I claim as new and desire to secure by Letters Patent, is:—

1. In a time recorder, a recording mechanism operator, a tray shifting member, a positioning means for said shifting member, a time movement connected to position said means, a tray latch, means for actuating the shifting member and controlling the position of the tray latch, said means including an element movable into and out of position for engagement with the recording mechanism operator whereby the said means is actuated upon actuation of the recording mechanism operator, and a member normally holding the element out of engaging position, said time movement operatively related to said member.

2. In a time recorder, a recording mechanism operator, a tray shifting member, a positioning means for said shifting member, a time movement connected to position said means, a tray latch, means for actuating the shifting member and controlling the position of the tray latch, said means including an element movable into and out of position for engagement with the recording mechanism operator whereby said means is actuated upon actuation of the recording mechanism operator, and a member normally holding the element out of engaging position, said time movement operatively related to said member, and means whereby said recording mechanism operator is rendered operative for manually effecting a movement of said element.

3. In a time recorder, a recording mechanism operator, a tray shifting member, a positioning means for said shifting member, a time movement connected to position said means, a tray latch, means for actuating the shifting member and controlling the position of the tray latch, said means including an element movable into and out of position for engagement with the recording mechanism operator whereby said means is actuated upon actuation of the recording mechanism operator, and a member normally holding the element out of engaging position, said time movement operatively related to said member, means whereby said recording mechanism operator is rendered operative for manually effecting a movement of said element, said locating member comprising means for retaining the shifting member under control of the locating member in opposition to manually shifted positions of the shifting member.

4. In a time recorder, a recording mechanism operator, a tray shifting member, a positioning means for said shifting member, a time movement connected to position said means, a tray latch, means for actuating the shifting member and controlling the position of the tray latch, said means including an element movable into and out of position for engagement with the recording mechanism operator whereby said means is actuated upon actuation of the recording mechanism operator, and a mechanism normally holding the element out of engaging position, said time movement operatively related to said member, said last named mechanism including a pawl and a time movement actuated shifter therefor, and manual means for moving said pawl.

5. In a time recorder, a recording mechanism operator, a tray shifting member, a positioning means for said shifting member, a time movement connected to position said means, a tray latch, means for actuating the shifting member and controlling the position of the tray latch, said means including an element movable into and out of position for engagement with the recording mechanism operator whereby said means is actuated upon actuation of the recording mechanism operator, and means comprising a pawl normally holding the element out of engaging position except when released, said time movement operatively related to said member, and a time movement actuated mechanism for periodically releasing said pawl.

6. In a time recorder a card tray, a time movement, a recording mechanism operator, a tray shifting member, an element positioned by the time movement for positioning the shifting member, said shifting member being movable by the recording mechanism to effect a tray movement, and means having its position controlled by the time movement for inhibiting the movement of said shifting member or allowing said movement at predetermined intervals, a mechanism including a lock and a manually controlled member, said lock controlling operation of said mechanism and its connection to said manually controlled members, said member arranged to position the tray shifting member for irregular registrations, said mechanism constructed and arranged to release the inhibiting means.

7. In a time recorder, a card tray, a time movement, a recording mechanism operator, a tray shifting member, a locating element having its position controlled by the time movement for locating the shifting member, said locating element being movable by the recording mechanism operator to move the shifting member and effect a tray movement, and means having its position controlled by the time movement for inhibiting the movement of said shifting member or allowing said movement at predetermined intervals.

8. In a time recorder, a card tray, a time movement, a recording mechanism operator, a tray shifting member, a locating element having its position controlled by the time movement for locating the shifting member, said locating element being movable by the recording mechanism operator to move the shifting member and effect a tray movement, and means for retaining the tray against movement but allowing said movement upon tray shifting movement of said locating element.

9. In a time recorder, a card tray, a time movement, a recording mechanism operator, a tray shifting member, a locating element having its position controlled by the time movement for locating the shifting member, said locating element being movable by the recording mechanism operator to move the shifting member and effect a tray movement, means having its position controlled by the time movement for inhibiting the movement of said shifting member or allowing said movement at predetermined intervals, and means for retaining the tray against movement but allowing said movement upon tray shifting movement of said locating element.

10. In a time recorder, a card tray, a time movement, a recording mechanism operator, a tray shifting member, a locating element having its position controlled by the time movement for locating the shifting member, said locating element being movable by the recording mechanism operator to move the shifting member and effect a tray movement, means having its position controlled by the time movement for inhibiting the movement of said shifting member or allowing said movement at predetermined intervals, and means for throwing out the inhibiting means manually, for temporary manual positioning of said tray other than at any of the predetermined intervals.

11. In a time recorder, a card tray, a time movement, a recording mechanism operator, a tray shifting member, a locating element having its position controlled by the time movement for locating the shifting member, said locating element being movable by the recording mechanism operator to move the shifting member and effect a tray movement, means for retaining the tray against movement but allowing said movement upon tray shifting movement of said locating element, means having its position controlled by the time movement for inhibiting the movement of said shifting member or allowing said movement at predetermined intervals, and means for throwing out the inhibiting means and the tray retaining means for a temporary manual positioning of the tray.

12. In a time recorder, a card tray, a time movement, a recording mechanism operator, a tray shifting member, a locating element having its position controlled by the time movement for locating the shifting member, said locating element being movable by the recording mechanism operator to move the shifting member and effect a tray movement, means for retaining the tray against movement but allowing said movement upon tray shifting movement of said locating element, means having its position controlled by the time movement for inhibiting the movement of said shifting member or allowing said movement at predetermined intervals, and means for throwing out the inhibiting means manually, for the purpose of temporary manual positioning of said tray other than at a predetermined interval, the recording mechanism operator and inhibiting means constructed and arranged to re-establish inhibiting position at the next operation allowed by the time movement.

ELMER G. STRECKFUSS.